United States Patent
Huang et al.

(10) Patent No.: US 11,492,555 B2
(45) Date of Patent: Nov. 8, 2022

(54) PROCESSING METHOD FOR PERENNIALLY POLLUTED SLUDGE CONTAINING OILS AND WATER, WASTE RESIDUES OR OIL SANDS DEEP IN NATURAL OIL MINES, AND PROCESSING SYSTEM THEREOF

(71) Applicant: SOUTHEAST UNIVERSITY, Jiangsu (CN)

(72) Inventors: Ying Huang, Jiangsu (CN); Dong Zhang, Jiangsu (CN); Rong Zha, Jiangsu (CN); Meng Ying, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/611,459

(22) PCT Filed: May 15, 2020

(86) PCT No.: PCT/CN2020/090477
§ 371 (c)(1),
(2) Date: Apr. 12, 2022

(87) PCT Pub. No.: WO2020/233510
PCT Pub. Date: Nov. 26, 2020

(65) Prior Publication Data
US 2022/0243129 A1    Aug. 4, 2022

(30) Foreign Application Priority Data
May 17, 2019    (CN) .......................... 201910416284.5

(51) Int. Cl.
*C10G 1/04*    (2006.01)
*C02F 11/00*    (2006.01)
(Continued)

(52) U.S. Cl.
CPC ........... *C10G 1/045* (2013.01); *B01D 1/2846* (2013.01); *B01D 17/02* (2013.01); *C02F 11/002* (2013.01);
(Continued)

(58) Field of Classification Search
CPC .................... C10G 1/045; C10G 33/06; C10G 2300/4006; C10G 2300/4012;
(Continued)

(56) References Cited

U.S. PATENT DOCUMENTS

2016/0348010 A1\* 12/2016 Bulbuc .................. C10G 1/045

FOREIGN PATENT DOCUMENTS

| CN | 1526797 A | 9/2004 |
|----|-----------|--------|
| CN | 100340503 C | 10/2007 |

(Continued)

OTHER PUBLICATIONS

Jamaluddin, A. et al., 2018, Heavy Oil Exploitation, PennWell, 307 pp [Office action cites p. 234].\*

*Primary Examiner* — Brian A McCaig
(74) *Attorney, Agent, or Firm* — Muncy, Geissler, Olds & Lowe, P.C.

(57) ABSTRACT

A processing method for perennially and deeply polluted sludge containing oils and water, waste residues, or oil sands in natural oil mines, and a processing system thereof. In the method, a solid substance containing oils and water is in full contact with an organic liquid solvent with a low boiling point and a weak polarity or no polarity at room temperature under pressurized condition to extract oil and water from the solid substance to the liquid, the organic solvent with low boiling point and low latent heat is easily separated from oil and water in the liquid after solid-liquid separation by decompression or heating evaporation, the gas solvent is compressed and condensed for recycling, the extracted oil (Continued)

and water are subjected to oil-water separation, and the extracted oil may be used as fuel or used for refining.

8 Claims, 1 Drawing Sheet

(51) Int. Cl.
    *C02F 11/121*     (2019.01)
    *C10G 33/06*     (2006.01)
    *B01D 17/02*     (2006.01)
    *B01D 1/28*     (2006.01)
    *C02F 103/36*     (2006.01)

(52) U.S. Cl.
    CPC ............ *C02F 11/121* (2013.01); *C10G 33/06* (2013.01); *C02F 2103/365* (2013.01); *C10G 2300/4006* (2013.01); *C10G 2300/4012* (2013.01); *C10G 2300/44* (2013.01)

(58) Field of Classification Search
CPC .. C10G 2300/44; C02F 11/002; C02F 11/121; C02F 2103/365; B01D 1/2846; B01D 17/02

See application file for complete search history.

(56) References Cited

FOREIGN PATENT DOCUMENTS

| | | |
|---|---|---|
| CN | 101823824 A | 9/2010 |
| CN | 102391185 A | 3/2012 |
| CN | 103570199 A | 2/2014 |
| CN | 103964543 A | 8/2014 |
| CN | 105771310 A | 7/2016 |
| CN | 108251153 A | 7/2018 |
| WO | WO-2011081734 A1 | 7/2011 |

* cited by examiner

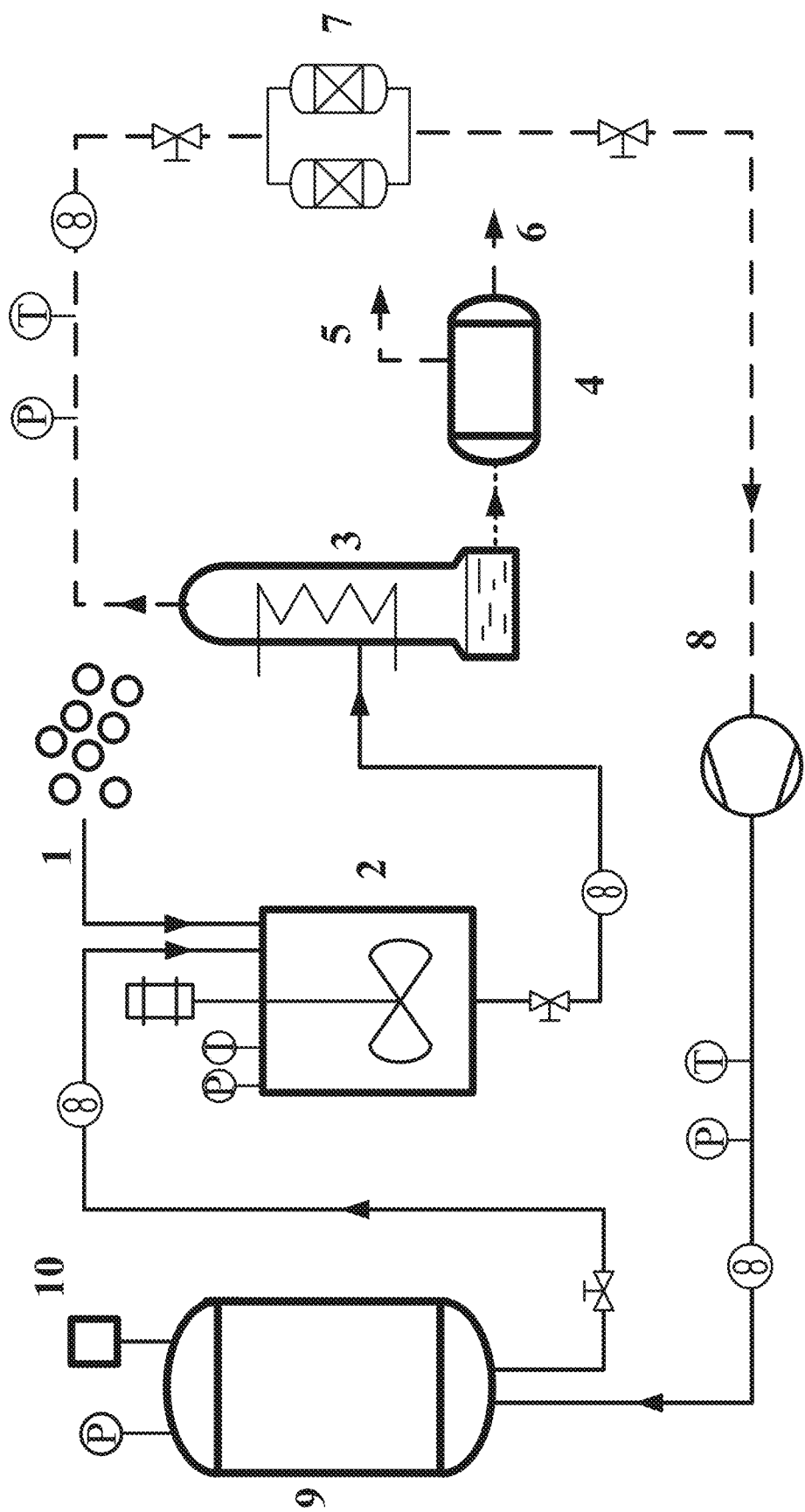

PROCESSING METHOD FOR PERENNIALLY POLLUTED SLUDGE CONTAINING OILS AND WATER, WASTE RESIDUES OR OIL SANDS DEEP IN NATURAL OIL MINES, AND PROCESSING SYSTEM THEREOF

TECHNICAL FIELD

The present invention relates to the field of environmental pollution, and specifically, to a processing method for perennially and deeply polluted sludge containing oils and water, waste residues, or oil sands in natural oil mines, and a processing system thereof, and is particularly suitable for sludge at the bottom of crude oil tanks during storage and transportation, sludge containing oils and water from oil refineries and wastewater processing plants, soil, sand, and oil sands that are contaminated by oil, oil-containing waste clay from petrochemical industries, oil-containing waste residue from petrochemical industries, oil-containing soil remaining in the oil field after oil extraction, and the like, and can recycle oil after the processing.

BACKGROUND

A large amount of oily sludge is produced during petroleum extraction, production, and storage. It shows from the research of the environmental protection agency (EPA) that every 500 tons of crude oil processed will produce 1 ton of sludge, and China's petroleum industry produces more than 3 million tons of sludge annually. If the oily sludge is not subjected to harmless processing, it will threaten the ecological environment and human health to varying degrees. The oil contained in perennially and deeply polluted sludge containing oils and water, or waste residues, or contained in oil sands in natural oil mines is petroleum hydrocarbons consisting of carbon and hydrogen. Randomly piled oily sludge will pollute the surrounding soil, so that the content of petroleum hydrocarbons in the soil exceeds the standard, the soil is compacted, and the vegetation in the soil is destroyed. The oily sludge is rich in toxic and harmful substances such as heavy metals, pathogenic bacteria, and radionuclides, and these substances are difficult to degrade and may cause fatal diseases. In recent years, due to the dangerous characteristics and increasing output of oily sludge, oily sludge processing and disposal technologies have attracted more and more attention from domestic and foreign researchers, including incineration, solidification/stabilization, oxidation, biodegradation, pyrolysis, solvent extraction, and the like.

The ordinary liquid solvent extraction method is widely applied to the processing of semi-volatile and hard-to-volatile organic substances. Oily sludge is mixed with an organic solvent that is suitable for the oily sludge as an extractant, wherein water, solid particles, and carbon-containing impurities in the oily sludge cannot be dissolved in the extractant, and the mixture of extractant and oil is subjected to flash evaporation to separately recover the oil and extractant. The extraction method can be used to thoroughly process oily sludge and to extract and recover most of petroleum hydrocarbons. However, the extraction needs to consume a large amount of extractant and has high costs, especially, the separation of the extractant and oil usually requires rectification to recover the extractant, which consumes a lot of energy, so that the processing by the extraction method is high in costs. Therefore, the extraction method is rarely applied to the processing of oily sludge in oil refineries.

The patent CN1526797A provides an oily sludge extraction method with an extractant of light coal tar (with a boiling point of 45-90° C. at atmospheric pressure), petroleum ether, and light oil. Water, oil, and residue in the oily sludge are separated in an extraction tower at a temperature of 45-55° C. with the effect of dissolution of fuel oil in the oily sludge by the extractant. However, regardless of whether it is a batch process or a continuous process, the mixture needs to be heated above 100° C. for fractional distillation to recover the extractant and obtain the fuel oil, which consumes a lot of energy.

The patent CN100340503C provides a method for recovering oil from oily sludge by multi-effect thermal extraction using oil with a wide boiling-point range (of 100-500° C.) as a solvent oil for extraction, and almost all the oil is recovered from the sludge. However, the process is complex and requires a lot of equipments, and the extracted mixture of oil and solvent oil is difficult to separate to obtain and recycle the solvent oil with stable composition.

The patent CN101823824A provides a method for extracting fuel oil from dried sludge using a mixture of one or more of C4-C20 hydrocarbons with a boiling-point range of 40-200° C. as an extractant. However, extractant regeneration and recycling needs to be achieved in a rectification tower from the extracted liquid mixture, which consumes a lot of energy to recover the extractant.

The patent CN103570199A provides a mixed oil extractant including a primary agent A of distillate oil with a boiling-point range of 110-135° C., a secondary agent B of distillate oil with a boiling-point range of 140-150° C., and an auxiliary agent C of distillate oil with a boiling-point range of 80-100° C. The distillate oil is naphtha, light oil, and the like. The operation temperature is 100-150° C. However, the separated liquid is subjected to rectification according to the boiling-point ranges of the primary agent A, secondary agent B, and auxiliary agent C, and is then compounded into a fresh mixed solvent, which also consumes a lot of energy to recover the extractant.

In summary, current raw materials of an extractant for oily solid substances, especially perennially and deeply polluted sludge containing oils and water, waste residues, or oil sands in natural oil mines, are mainly liquid solvents at room temperature and atmospheric pressure or mixed solvents with a wide boiling-point range, such as light coal tar, petroleum ether, naphtha, benzene, and toluene, which can achieve adequate extraction under a specific temperature and pressure. However, a key problem of the foregoing solvent extraction method is that the liquid extractant needs to be recovered by separating it from the extracted oil through complex processes such as rectification at room temperature and atmospheric pressure, which affects the economic performance of the oily sludge extraction technology and temporarily delays the promotion and application of this technology. In addition, the oily solid substance, for example, oily sludge, also contains a small amount of water that is not easy to remove, which means that it is necessary to remove low-content water from the oily solid substance along with the recovery of oil. Therefore, the key to the development of oily solid extraction technology is to discover and develop better extractants and efficient extraction methods to remove low-content water from the oily solid and recover oil from the oily solid.

SUMMARY

Objective of the invention: To resolve problems existing in the prior art, the present invention provides a processing method for perennially and deeply polluted sludge containing oils and water, waste residues, or oil sands in natural oil mines, which can recover oil from a solid substance deeply containing oils and water. This method is a high-performance and low-consumption processing method for a solid substance containing oils and water (especially perennially and deeply polluted sludge containing oils and water, waste residues, or oil sands in natural oil mines). The method of the present invention is effective in oil extraction, thorough in separation of a solvent and recovered oil, simple and energy-saving in reuse of the solvent, and simultaneous in oil extraction and water removal, thereby achieving the recovery of oil from deeply oily sludge, and resource utilization and energy utilization to a greater extent.

The present invention further provides a processing system for perennially and deeply polluted sludge containing oils and water, waste residues, or oil sands in natural oil mines.

Technical solution: To achieve the foregoing objective, the present invention provides a processing method for perennially and deeply polluted sludge containing oils and water, waste residues, or oil sands in natural oil mines, including the following steps:

(A) allowing a solid substance containing oils and water to be in full contact with an organic liquid solvent with a low boiling point and a weak polarity or no polarity at room temperature under pressurized condition to extract oil by the solvent from the solid substance containing oils and water to the liquid, to obtain a deoiled solid and a solvent-oil-water mixture, wherein the solid substance containing oils and water is perennially and deeply polluted sludge containing oils and water, waste residues, or oil sands in natural oil mines;

(B) performing solid-liquid separation on the obtained deoiled solid and solvent-oil-water mixture;

(C) performing gasification separation on the solvent-oil-water mixture obtained after the solid-liquid separation to separate the organic solvent with a low boiling point and a weak polarity or no polarity for recycling; and (D) performing oil-water separation on the oil-water mixture obtained by the separation in step (C) to obtain extracted oil.

In step (A), the extraction temperature is preferably −10-45° C., and the extraction temperature is further 10-25° C. In the present invention, the extraction pressure allows the organic solvent to be kept in liquid state without any particular limitations.

In step (A), the organic solvent with a low boiling point and a weak polarity or no polarity is gaseous at room temperature and atmospheric pressure or has a boiling point below 25° C.

Preferably, in step (A), the organic solvent with a low boiling point and a weak polarity or no polarity is gaseous at room temperature and atmospheric pressure or has a boiling point below 25° C. Preferably, the organic solvent is a mixture of any one or more of a hydrocarbon solvent, an aldehyde solvent, a ketone solvent, and an ether solvent. The hydrocarbon solvent is one of propane, butane, and butadiene. The aldehyde solvent is any one of formaldehyde and acetaldehyde. The ketone solvent is, for example, cyclopropenone. The ether solvent is a mixture of any one or more of diethyl ether, methoxyethane, and dimethyl ether. More preferably, the organic solvent is a mixture of any one or more of butane, butadiene, formaldehyde, dimethyl ether, and methoxy ethane.

In step (A), the solid substance containing oils and water and the organic liquid solvent with a low boiling point and a weak polarity or no polarity are in contact in a mass ratio of 1:(1-200) for 0.01-10 h. Preferably, the solid substance containing oils and water and the organic liquid solvent with a low boiling point and a weak polarity or no polarity are in contact in a mass ratio of 1:(5-80) for 0.5-1 h.

Preferably, in step (A), the full contact requires stirring at a rotational speed of 0-1000 rpm. Further, the rotational speed is 50-100 rpm.

In step (B), the solid-liquid separation is carried out by filtration or centrifugation.

In step (C), the gasification separation is carried out by decompression or heating evaporation, so that the liquid solvent is gasified to separate from oil and water, and then the solvent is recovered by compression and condensation of the gas solvent.

In step (D), the oil-water separation is carried out by centrifugation or gravity separation.

The present invention provides a processing system for perennially and deeply polluted sludge containing oils and water, waste residues, or oil sands in natural oil mines, including an extraction reactor, a gas-liquid separator, a dryer, a compression condenser, and a solvent storage tank that are sequentially connected, wherein a pressurizing device is disposed on the solvent storage tank, and the gas-liquid separator is connected to an oil-water separator.

A stirring device is disposed in the extraction reactor (2), and a filtering device is disposed at an outlet of the extraction reactor (2). In addition, the whole system is further provided with a plurality of thermometers and manometers, and a flowmeter and a valve are provided between components.

In the present invention, a processing and oil recovery method for perennially and deeply polluted sludge containing oils and water, waste residues, or oil sands in natural oil mines is suitable for sludge at the bottom of crude oil tanks during storage and transportation, sludge containing oils from oil refineries and wastewater processing plants, soil, sand, and oil sands that are contaminated by oil, oil-containing waste clay from petrochemical industries, oil-containing waste residue from petrochemical industries, oil-containing soil remaining in the oil field after oil extraction, and the like, and is particularly suitable for sludge perennially and deeply containing oils at the bottom of crude oil tanks, sludge containing oils, sludge, soil, and sand that are deeply contaminated by oil, oil sands in natural oil mines, and the like, which has a significant effect and can recycle oil after the oil-containing solid substance is processed. In the present invention, a solid substance containing oils and water, for example, oily sludge, is in full contact with an organic liquid solvent with a low boiling point and a weak polarity or no polarity at room temperature under pressurized condition to extract oil and water from the solid substance to the liquid, the organic solvent with low boiling point and low latent heat is easily separated from oil and water in the liquid after solid-liquid separation by decompression or heating evaporation, the gas solvent is compressed and condensed for recycling, the extracted oil and water are subjected to oil-water separation, and the extracted oil may be used as fuel or used for refining.

Beneficial Effects: Compared with the Prior Art, the Present Invention has the Following Advantages:

The processing method for a solid substance containing oils and water in the present invention can be used to efficiently extract oil from sludge perennially and deeply containing oils at the bottom of crude oil tanks, sludge containing oils, sludge, soil, and sand that are deeply contaminated by oil, and the like. The solvent of the present invention has a low boiling point and a weak polarity or no polarity, so that the solvent is easily and efficiently separated from the recovered oil, which only needs to gasify the solvent by flash evaporation under reduced pressure to obtain the solvent gas and the recovered oil, and the solvent gas can be reused by quickly pressurized condensation. In addition, according to the principle of "like dissolves like", the solvent, as a weakly polar or non-polar organic substance, can strongly dissolve a large amount of weakly polar or non-polar hydrocarbons existing in the solid substance containing oils at room temperature.

In the processing method of the present invention, the extraction is carried out under airtight and pressurized operating conditions, so that oil in the solid substance containing oils and water will undergo full penetration and displacement under a specific pressure and temperature, and the solvent can be in contact with the solid substance to the greatest extent to separate the viscous oil covering the solid substance into the solvent.

For another advantage of the present invention, the pressure difference of filtration for solid-liquid separation in step (B) can be provided by pressurizing the solvent in the system, and a filter can be provided next to an extraction tank to achieve a good filtration effect, reducing energy consumption and equipment investment.

In the present invention, the processing method for a solid substance containing oils and water, especially for perennially and deeply polluted sludge containing oils and water, waste residues, or oil sands in natural oil mines, can be used to extract oil and remove water simultaneously, which has advantages of short operation time, high extraction efficiency, and easy separation and recovery of a solvent for extraction.

In the present invention, the processing system for a solid substance containing oils and water is simple in structure and convenient to use, and can process the solid substance containing oils and water efficiently and at low cost in combination with the processing method of the present invention.

BRIEF DESCRIPTION OF THE DRAWINGS

The sole FIGURE is a schematic diagram of a processing system for a solid substance containing oils and water.

LIST OF REFERENCE NUMERALS IN THE SOLE FIGURE

1—Solid substance containing oils and water; 2—Extraction reactor; 3—Flash evaporation gas-liquid separator; 4—Oil-water separator; 5—Recovered oil; 6—Waste water; 7—Dryer; 8—Compression condenser; 9—Solvent storage tank; 10—Pressurizing device; ⓟ—Manometer; ⓣ—Thermometer; and ⓢ—Flowmeter.

DETAILED DESCRIPTION

The present invention is further described below with reference to examples and the accompanying drawings.

In the present invention, the detection standard is determined by the mass percentage of the extracted organic ingredient in the total organic ingredients of a solid substance containing oils and water.

A method for determining the total organic ingredients of a solid substance containing oils and water includes drying the solid substance containing oils and water at 105° C. to remove water to a constant weight, then roasting the dried solid substance in a muffle furnace at 600° C. for 2 h to obtain a weight, and determining the difference between the two weight values as the mass of oil contained in the solid substance.

A method for determining the mass of oil extracted and separated from a solid substance containing oils and water includes measuring mass values of oil contained in the solid substance before and after extraction, and determining the difference between the mass values before and after extraction as the mass of oil.

The ratio of the mass of the extracted oil to the mass of the original oil in the solid substance containing oils and water is the oil extraction rate (P %).

$$P\% = \frac{\text{Mass of extracted oil}}{\text{Mass of original oil in solid substance containing oil and water}} \times 100\%$$

The solid substance containing oils and water in the examples of the present invention is perennially and deeply polluted sludge containing oils and water, and waste residues from a lubricant refinery, or oil sands in natural oil mines.

Example 1

As shown in the sole FIGURE, a processing system for perennially and deeply polluted sludge containing oils and water, waste residues, or oil sands in natural oil mines includes an extraction reactor 2, a gas-liquid separator 3, a dryer 7, a compression condenser 8, and a solvent storage tank 9 that are sequentially connected, where a pressurizing device 10 is disposed on the solvent storage tank 9, and the gas-liquid separator 3 is connected to an oil-water separator 4; a stirring device is disposed in the extraction reactor 2; and a filtering device is disposed at an outlet of the extraction reactor 2. A manometer and a thermometer are disposed on the extraction reactor 2. A manometer is disposed on the solvent storage tank 9. A valve and a flowmeter are provided between the extraction reactor 2 and the solvent storage tank 9 and between the extraction reactor 2 and the gas-liquid separator 3. A manometer, a thermometer, and a valve are provided between the gas-liquid separator 3 and the dryer 7. Valves are provided near the dryer 7. A manometer, a thermometer, and a valve are provided between the compression condenser 8 and the solvent storage tank 9.

The processing of the solid substance containing oils and water is as follows. A solid substance containing oils and water 1 is added into an extraction reactor 2 in advance. A liquid solvent is pressurized by a pressurizing device 10 and then flows from a solvent storage tank 9 into the extraction reactor 2 with a flow rate controlled by a flowmeter. The solvent is kept liquid in the extraction reactor 2 by specific pressure during extraction. The extraction reactor 2 is configured with a stirring device. The stirring device is adjusted to a proper rotational speed to allow the liquid solvent to be in full contact with the solid substance, so that oil and water are extracted into the liquid solvent. A filtering device is provided at an outlet of the extraction reactor 2. When a valve at the outlet of the extraction reactor 2 is opened, the solid of the solid substance containing oils and water is trapped in the extraction reactor 2, and the liquid solvent-oil-water mixture flows into a gas-liquid separator 3. When the valve is closed, decompression and/or heating are/is carried out in the gas-liquid separator. Due to the reduced pressure and increased temperature, the liquid solvent is rapidly gasified, and the oil and water are kept liquid in the gas-liquid separator. The gasified solvent is dried by a dryer 7, and is then compressed and condensed, to flow into the solvent storage tank 9 for reuse. The liquid in the gas-liquid separator 3 enters an oil-water separator 4 to separate recovered oil 5 and waste water 6.

Example 2

In this example, dimethyl ether, which is a gas at room temperature and atmospheric pressure, was used as a solvent for extraction with a boiling point of −24.9° C., and a solid substance containing oils and water with a water content of 2.81%, an oil content of 33.63%, and a solid content of 63.56% was obtained from a lubricant refinery. The solid substance containing oils and water was processed as follows. 40 g of the solid substance containing oils was placed in the extraction reactor 2. The liquid solvent flowed from the solvent storage tank 9 to the extraction reactor 2 at 15° C. under pressurization by the pressurizing device 10, and pressurization was carried out in the extraction reactor 2 to keep the solvent in liquid state. The mass ratio of the solid substance containing oils and water to the liquid solvent was 1:25, the rotational speed for stirring was 50 rpm, and the contact time was 60 min. After the extraction, the solvent in which oil and water were dissolved was filtered out and then flowed from the extraction reactor 2 to the gas-liquid separator 3 when the valve was opened. When the valve was closed, decompression and/or heating were/was carried out in the gas-liquid separator. Due to the reduced pressure and increased temperature, the liquid solvent was rapidly gasified, and the oil and water were kept liquid in the gas-liquid separator 3. The gasified solvent was dried by the dryer 7, and was then compressed and condensed by the compression condenser 8, to flow into the solvent storage tank 9 for reuse. The liquid in the gas-liquid separator 3 entered the oil-water separator 4 to separate recovered oil 5 and waste water 6. The solid substance after extraction has an oil content of 5.97%, a water content of 0.22%, an oil extraction rate of 82.5%, a water removal rate of 92.3%, and a solvent recovery rate of 98.1%.

Example 3

In this example, dimethyl ether, which is a gas at room temperature and atmospheric pressure, was used as a solvent for extraction with a boiling point of −24.9° C., and a solid substance containing oils and water with a water content of 2.81%, an oil content of 33.63%, and a solid content of 63.56% was obtained from a lubricant refinery. The solid substance containing oils and water was processed as follows. 40 g of the solid substance containing oils was placed in the extraction reactor 2. The liquid solvent flowed from the solvent storage tank 9 to the extraction reactor 2 at 10° C. under pressurization by the pressurizing device 10, and pressurization was carried out in the extraction reactor 2 to keep the solvent in liquid state. The mass ratio of the solid substance containing oils and water to the liquid solvent was 1:10, the rotational speed for stirring was 50 rpm, and the contact time was 60 min. After the extraction, the solvent in which oil and water were dissolved was filtered out and then flowed from the extraction reactor 2 to the gas-liquid separator 3 when the valve was opened. When the valve was closed, decompression and/or heating were/was carried out in the gas-liquid separator. Due to the reduced pressure and increased temperature, the liquid solvent was rapidly gasified, and the oil and water were kept liquid in the gas-liquid separator 3. The gasified solvent was dried by the dryer 7, and was then compressed and condensed by the compression condenser 8, to flow into the solvent storage tank 9 for reuse. The liquid in the gas-liquid separator 3 entered the oil-water separator 4 to separate recovered oil 5 and waste water 6. The solid substance after extraction has an oil content of 9.5%, a water content of 0.32%, an oil extraction rate of 71.8%, a water removal rate of 88.9%, and a solvent recovery rate of 98.6%.

Example 4

In this example, dimethyl ether, which is a gas at room temperature and atmospheric pressure, was used as a solvent for extraction with a boiling point of −24.9° C., and a solid substance containing oils and water with a water content of 2.81%, an oil content of 33.63%, and a solid content of 63.56% was obtained from a lubricant refinery. The solid substance containing oils and water was processed as follows. 40 g of the solid substance containing oils was placed in the extraction reactor 2. The liquid solvent flowed from the solvent storage tank 9 to the extraction reactor 2 at 15° C. under pressurization by the pressurizing device 10, and pressurization was carried out in the extraction reactor 2 to keep the solvent in liquid state. The mass ratio of the solid substance containing oils and water to the liquid solvent was 1:80, the rotational speed for stirring was 50 rpm, and the contact time was 60 min. After the extraction, the solvent in which oil and water were dissolved was filtered out and then flowed from the extraction reactor 2 to the gas-liquid separator 3 when the valve was opened. When the valve was closed, decompression and/or heating were/was carried out in the gas-liquid separator. Due to the reduced pressure and increased temperature, the liquid solvent was rapidly gasified, and the oil and water were kept liquid in the gas-liquid separator 3. The gasified solvent was dried by the dryer 7, and was then compressed and condensed by the compression condenser 8, to flow into the solvent storage tank 9 for reuse. The liquid in the gas-liquid separator 3 entered the oil-water separator 4 to separate recovered oil 5 and waste water 6. The solid substance after extraction has an oil content of 0.81%, a water content of 0.14%, an oil extraction rate of 97.6%, a water removal rate of 95.1%, and a solvent recovery rate of 96.1%.

Example 5

In this example, methoxyethane, which is a gas at room temperature and atmospheric pressure, was used as a solvent for extraction with a boiling point of 7.4° C., and a solid substance containing oils and water with a water content of 12.55%, an oil content of 55.63%, and a solid content of 31.82% was obtained from an oil refinery. The solid substance containing oils and water was processed as follows. 40 g of the solid substance containing oils was placed in the extraction reactor 2. The liquid solvent flowed from the solvent storage tank 9 to the extraction reactor 2 at 10° C. under pressurization by the pressurizing device 10, and pressurization was carried out in the extraction reactor 2 to keep the solvent in liquid state. The mass ratio of the solid substance containing oils and water to the liquid solvent was 1:10, the rotational speed for stirring was 50 rpm, and the contact time was 60 min. After the extraction, the solvent in which oil and water were dissolved was filtered out and then flowed from the extraction reactor 2 to the gas-liquid separator 3 when the valve was opened. When the valve was closed, decompression and/or heating were/was carried out in the gas-liquid separator. Due to the reduced pressure and increased temperature, the liquid solvent was rapidly gasified, and the oil and water were kept liquid in the gas-liquid separator 3. The gasified solvent was dried by the dryer 7, and was then compressed and condensed by the compression condenser 8, to flow into the solvent storage tank 9 for reuse. The liquid in the gas-liquid separator 3 entered the oil-water separator 4 to separate recovered oil 5 and waste water 6. The solid substance after extraction has an oil content of 28.43%, a water content of 2.33%, an oil extraction rate of 48.89%, a water removal rate of 83.6%, and a solvent recovery rate of 96.1%.

Example 6

In this example, butane, which is a gas at room temperature and atmospheric pressure, was used as a solvent for extraction with a boiling point of −1° C., and a solid substance containing oil and water with a water content of 0.81%, an oil content of 43.63%, and a solid content of 53.56% was obtained from a lubricant refinery. The solid substance containing oils and water was processed as follows. 40 g of the solid substance containing oils was placed in the extraction reactor 2. The liquid solvent flowed from the solvent storage tank 9 to the extraction reactor 2 at 25° C. under pressurization by the pressurizing device 10, and pressurization was carried out in the extraction reactor 2 to keep the solvent in liquid state. The mass ratio of the solid substance containing oils and water to the liquid solvent was 1:15, the rotational speed for stirring was 50 rpm, and the contact time was 30 min. After the extraction, the solvent in which oil and water were dissolved was filtered out and then flowed from the extraction reactor 2 to the gas-liquid separator 3 when the valve was opened. When the valve was closed, decompression and/or heating were/was carried out in the gas-liquid separator. Due to the reduced pressure and increased temperature, the liquid solvent was rapidly gasified, and the oil and water were kept liquid in the gas-liquid separator 3. The gasified solvent was dried by the dryer 7, and was then compressed and condensed by the compression condenser 8, to flow into the solvent storage tank 9 for reuse. The liquid in the gas-liquid separator 3 entered the oil-water separator 4 to separate recovered oil 5 and waste water 6. The solid substance after extraction has an oil content of 15.97%, a water content of 0.06%, an oil extraction rate of 63.4%, a water removal rate of 92.6%, and a solvent recovery rate of 98.1%.

Example 7

In this example, butadiene, which is a gas at room temperature and atmospheric pressure, was used as a solvent for extraction with a boiling point of −4.4° C., and a solid substance containing oils and water with a water content of 12.31%, an oil content of 23.63%, and a solid content of 64.06% was obtained from a lubricant refinery. The solid substance containing oils and water was processed as follows. 40 g of the solid substance containing oils was placed in the extraction reactor 2. The liquid solvent flowed from the solvent storage tank 9 to the extraction reactor 2 at 25° C. under pressurization by the pressurizing device 10, and pressurization was carried out in the extraction reactor 2 to keep the solvent in liquid state. The mass ratio of the solid substance containing oils and water to the liquid solvent was 1:25, the rotational speed for stirring was 80 rpm, and the contact time was 60 min. After the extraction, the solvent in which oil and water were dissolved was filtered out and then flowed from the extraction reactor 2 to the gas-liquid separator 3 when the valve was opened. When the valve was closed, decompression and/or heating were/was carried out in the gas-liquid separator. Due to the reduced pressure and increased temperature, the liquid solvent was rapidly gasified, and the oil and water were kept liquid in the gas-liquid separator 3. The gasified solvent was dried by the dryer 7, and was then compressed and condensed by the compression condenser 8, to flow into the solvent storage tank 9 for reuse. The liquid in the gas-liquid separator 3 enters an oil-water separator 4 to separate recovered oil 5 and waste water 6. The solvent was recovered after extraction to separate the recovered oil and water. The solid substance after extraction has an oil content of 8.97%, a water content of 1.99%, an oil extraction rate of 62.0%, a water removal rate of 85.5%, and a solvent recovery rate of 96.1%.

Example 8

In this example, formaldehyde, which is a gas at room temperature and atmospheric pressure, was used as a solvent for extraction with a boiling point of −19.5° C., and a solid substance containing oils and water with a water content of 1.33%, an oil content of 38.63%, and a solid content of 60.04% was obtained from a vegetable oil refinery. The solid substance containing oils and water was processed as follows. 40 g of the solid substance containing oils was placed in the extraction reactor 2. The liquid solvent flowed from the solvent storage tank 9 to the extraction reactor 2 at 25° C. under pressurization by the pressurizing device 10, and pressurization was carried out in the extraction reactor 2 to keep the solvent in liquid state. The mass ratio of the solid substance containing oils and water to the liquid solvent was 1:5, the rotational speed for stirring was 50 rpm, and the contact time was 30 min. After the extraction, the solvent in which oil and water were dissolved was filtered out and then flowed from the extraction reactor 2 to the gas-liquid separator 3 when the valve was opened. When the valve was closed, decompression and/or heating were/was carried out in the gas-liquid separator. Due to the reduced pressure and increased temperature, the liquid solvent was rapidly gasified, and the oil and water were kept liquid in the gas-liquid separator 3. The gasified solvent was dried by the dryer 7, and was then compressed and condensed by the compression condenser 8, to flow into the solvent storage tank 9 for reuse. The liquid in the gas-liquid separator 3 entered the oil-water separator 4 to separate recovered oil 5 and waste water 6. The solvent was recovered after extraction to separate the recovered oil and water. The solid substance after extraction has an oil content of 20.34%, a water content of 0.32%, an oil extraction rate of 47.3%, a water removal rate of 76.2%, and a solvent recovery rate of 95.4%.

What is claimed is:

1. A processing method for perennially and deeply polluted sludge containing oils and water, waste residues, or oil sands in natural oil mines, comprising the following steps:
   (A) allowing a solid substance containing oils and water to be in full contact with an organic liquid solvent with a low boiling point and a weak polarity or no polarity at room temperature under pressurized condition to extract oil by the solvent from the solid substance containing oils and water to the liquid, to obtain a deoiled solid and a solvent-oil-water mixture, wherein the solid substance containing oils and water is perennially and deeply polluted sludge containing oils and water, waste residues, or oil sands in natural oil mines;

(B) performing solid-liquid separation on the obtained deoiled solid and solvent-oil-water mixture;

(C) performing gasification separation on the solvent-oil-water mixture obtained after the solid-liquid separation to separate the organic solvent with a low boiling point and a weak polarity or no polarity for recycling; and (D) performing oil-water separation on the oil-water mixture obtained by the separation in step (C) to obtain extracted oil, wherein in step (A), the extraction temperature is −10-45° C., and the extraction pressure allows the organic solvent with a low boiling point and a weak polarity or no polarity to be kept in liquid state; and the organic solvent with a low boiling point and a weak polarity or no polarity is gaseous at room temperature and atmospheric pressure or has a boiling point below 25° C.

2. The processing method for perennially and deeply polluted sludge containing oils and water, waste residues, or oil sands in natural oil mines according to claim 1, wherein in step (A), the solid substance containing oils and water and the organic liquid solvent with a low boiling point and a weak polarity or no polarity are in contact in a mass ratio of 1:(1-200) for 0.01-10 h.

3. The processing method for perennially and deeply polluted sludge containing oils and water, waste residues, or oil sands in natural oil mines according to claim 1, wherein in step (A), the full contact requires stirring at a rotational speed less than or equal to 1000 rpm.

4. The processing method for perennially and deeply polluted sludge containing oils and water, waste residues, or oil sands in natural oil mines according to claim 1, wherein in step (B), the solid-liquid separation is carried out by filtration or centrifugation.

5. The processing method for perennially and deeply polluted sludge containing oils and water, waste residues, or oil sands in natural oil mines according to claim 1, wherein in step (C), the gasification separation is carried out by decompression or heating evaporation, so that the liquid solvent is gasified to separate from oil and water, and then the solvent is recovered by compression and condensation of the gas solvent.

6. The processing method for perennially and deeply polluted sludge containing oils and water, waste residues, or oil sands in natural oil mines according to claim 1, wherein in step (D), the oil-water separation is carried out by centrifugation or gravity separation.

7. A processing system for perennially and deeply polluted sludge containing oils and water, waste residues, or oil sands in natural oil mines used in the processing method according to claim 1, comprising an extractor, a gas-liquid separator, a dryer, a compression condenser, and a solvent storage tank that are sequentially connected, wherein a pressurizing device is disposed on the solvent storage tank, and the gas-liquid separator is connected to an oil-water separator.

8. The processing system for perennially and deeply polluted sludge containing oils and water, waste residues, or oil sands in natural oil mines according to claim 7, wherein a stirring device is disposed in the extractor, and a filtering device is disposed at an outlet of the extractor.

* * * * *